United States Patent [19]

Imai

[11] Patent Number: 4,822,185
[45] Date of Patent: Apr. 18, 1989

[54] DRIVING METHOD OF A PRINTING APPARATUS EMPLOYING A NON-STABILIZED POWER SOURCE

[75] Inventor: Tatsuji Imai, Ichinomiya, Japan
[73] Assignee: Brother Kogyo Kabushiki Kaisha, Japan
[21] Appl. No.: 51,401
[22] Filed: May 19, 1987
[30] Foreign Application Priority Data
   May 20, 1986 [JP] Japan .................. 61-115887
[51] Int. Cl.⁴ .......................... B41J 29/38
[52] U.S. Cl. .................... 400/54; 400/185; 400/719; 318/98
[58] Field of Search ............. 400/54, 185, 157.3, 400/166, 719; 307/34–41; 318/98, 99

[56] References Cited
U.S. PATENT DOCUMENTS 4,027,761 6/1977 Quaif ..................... 400/124
4,195,938 4/1980 Velazquez ............... 400/124
4,493,570 1/1985 Araki ..................... 400/144.2

FOREIGN PATENT DOCUMENTS
203578 12/1982 Japan ..................... 400/54

OTHER PUBLICATIONS
*IBM TDB*, vol. 28, No. 11, 1986, Apr., "Hammer Rattling in a Line Printer", pp. 5154–5155.

*Primary Examiner*—Paul T. Sewell
*Attorney, Agent, or Firm*—Barnes & Thornburg

[57] ABSTRACT

A driving method for a printing apparatus having a non-stabilized power source compensates for power supply fluctuations by selectively driving an additional load, such as another electric actuator, in a non-functional mode to thereby stabilize the current and voltage supplied to driven electric actuator.

6 Claims, 5 Drawing Sheets

DRIVING METHOD OF A PRINTING APPARATUS EMPLOYING A NON-STABILIZED POWER SOURCE

BACKGROUND OF THE INVENTION

The present invention relates to a driving method of a printing apparatus employing a non-stabilized power source.

Among printing apparatuses such as typewriters, for example, the daisy-wheel type typewriter has a number of electric actuators such as a platen drive motor, a carriage drive motor, a ribbon feed motor, a ribbon lift motor, a type-wheel drive motor (type select motor) and a printing hammer solenoid, and these electric actuators are generally connected to a non-stabilized power source. Then, combinations of electric actuators operated in response to printing operation, paper feeding operation, spacing operation and carriage returning operation are different.

Thus, because of employing the non-stabilized power source, the current and the voltage acting on each electric actuator are varied according to the combination of operating a plurality of electric actuators.

For example, such a driving method is adopted that in the printing operation, electric currents are supplied to a drive circuit, the carriage drive motor, the type-wheel drive motor, the printing hammer solenoid and the ribbon feed motor simultaneously or continuously during a very short time, and in the spacing operation, electric currents are supplied only to the drive circuit and the carriage motor.

For one example, assuming that the characteristics of the above-mentioned non-stabilized power source are volt-current characteristics shown in FIG. 4 associated with the embodiment, in the printing operation and in the spacing operation, electric currents flowing through respective electric actuators and the drive circuit are as shown in Table 1.

TABLE 1

|  | Printing operation | Spacing operation |
|---|---|---|
| Voltage of non-stabilized power source | 12.4 V | 13.8 V |
| Drive circuit | 0.10 A | 0.10 A |
| Carriage drive motor | 0.67 A | 0.88 A |
| Type-wheel drive motor | 0.22 A | 0.00 A |
| Hammer solenoid | 0.10 A | 0.00 A |
| Platen drive motor | 0.00 A | 0.00 A |
| Ribbon feed motor | 0.10 A | 0.00 A |
| Total current | 1.19 A | 0.98 A |

In the above-mentioned examples of printing operation and spacing operation, because of employing the non-stabilized power source, the current flowing through the carriage drive motor varies even if the driving method of the carriage drive motor is the same, and in the spacing operation wherein operating loads are few, the current through the carriage drive motor increases remarkably, and therefore expensive elements having large maximum assured currents are required to be used as drive circuit elements of this drive motor, and since the driving voltage of the carriage drive motor also becomes large, the exciting time for stopping the motor is required to be extended, and the printing speed of the printing apparatus is reduced.

SUMMARY OF THE INVENTION

The object of the first invention and the second invention of the present application is to provide a driving method of a printing apparatus which, when one or a plurality of specific electric actuators are operated in a specific combination among various combinations of driving plural electric actuators (motors and solenoids), can stabilize currents and voltages of the specific actuators so as not to increase, and can increase the printing speed of the printing apparatus.

A driving method of a printing apparatus employing a non-stabilized power source according to the first invention comprises: connecting electric actuators such as motors and solenoids of a printing apparatus, to a non-stabilized power source; providing driving means for driving said electric actuators respectively, and a control means for controlling said driving means. When driving one or a plurality of specific electric actuators in a specific combination among various combinations of driving these plural electric actuators, driving, through said control means and driving means, an electric actuator other than said specific electric actuators in a mode different from the mode exerting its intrinsic function; thereby stabilizing the current and voltage supplied to said specific electric actuators.

A driving method of a printing apparatus employing a non-stabilized power source according to the second invention comprises: connecting plural electric actuators such as motors and solenoids of a printing apparatus to a non-stabilized power source; providing an additional electric load other than said electric actuators, connected to said non-stabilized power source; providing a control means for controlling said plural electric actuators and said electric load. When driving one or plural specific electric actuators in a specific combination among various combinations of driving these plural electric actuators, driving said electric load, through said control means, for stabilizing the current and voltage supplied to said specific electric actuators.

FUNCTION OF THE INVENTION

In a driving method of a printing apparatus in accordance with the first invention, where plural electric actuators such as motors and solenoids of a printing apparatus are connected to a non-stabilized power supply, in order to drive one or plural specific electric actuators in a specific combination among various combinations of driving plural these electric actuators, an electric actuator other than the specific electric actuators is driven in a mode different from the mode exerting its intrinsic function. Thus the electric load of the non-stabilized power source is increased, and therefore currents and voltages supplied to the specific electric actuators are reduced and stabilized.

In a driving method of a printing apparatus in accordance with the second invention, where one or plural specific actuators are connected o a non-stabilized power source as in the above-mentioned first invention, and an additional electric load is connected to the non-stabilized power source, when the electric load is driving. Thus, the electric load of the non-stabilized power source increases, and therefore currents and voltages supplied to the specific electric actuators are reduced and stabilized.

ADVANTAGES OF THE INVENTION

In accordance with a driving method of a printing apparatus of the first invention, as is described above, currents and voltages acting on specific electric actuators are stabilized by a simple method such that, when one or plural specific electric actuators are operated, the electric actuators other than the specific electric actuators are operated in a mode different from the mode exerting its intrinsic function, thereby a maximum value of the current flowing through the circuit elements of the drive circuits of the specific electric actuators is reduced and economical circuit elements with small maximum assured current can be used.

Then, for the motors among the specific electric actuators, the current of each is stabilized and does not increase unnecessarily, and therefore the exciting time of stop control when stopping the motor is reduced, and a reduction in the printing speed of the printing apparatus can be prevented.

In accordance with a driving method of a printing apparatus of the second invention, as is described above, an advantage similar to that of the first invention can be obtained without affecting the electric actuators other than the specific electric actuators at all by a simple method.

BRIEF DESCRIPTION OF THE DRAWINGS

Drawings relate to an embodiment in accordance with the present invention.

DESCRIPTION OF THE PREFERRED EMBODIMENTS

Hereinafter, description is made on embodiments in accordance with the present invention based on the drawings.

These embodiments are of the cases where the first invention and the second invention are applied to a daisy-wheel type electronic typewriter 1, and first a brief description is made on this typewriter 1.

Figure 1:
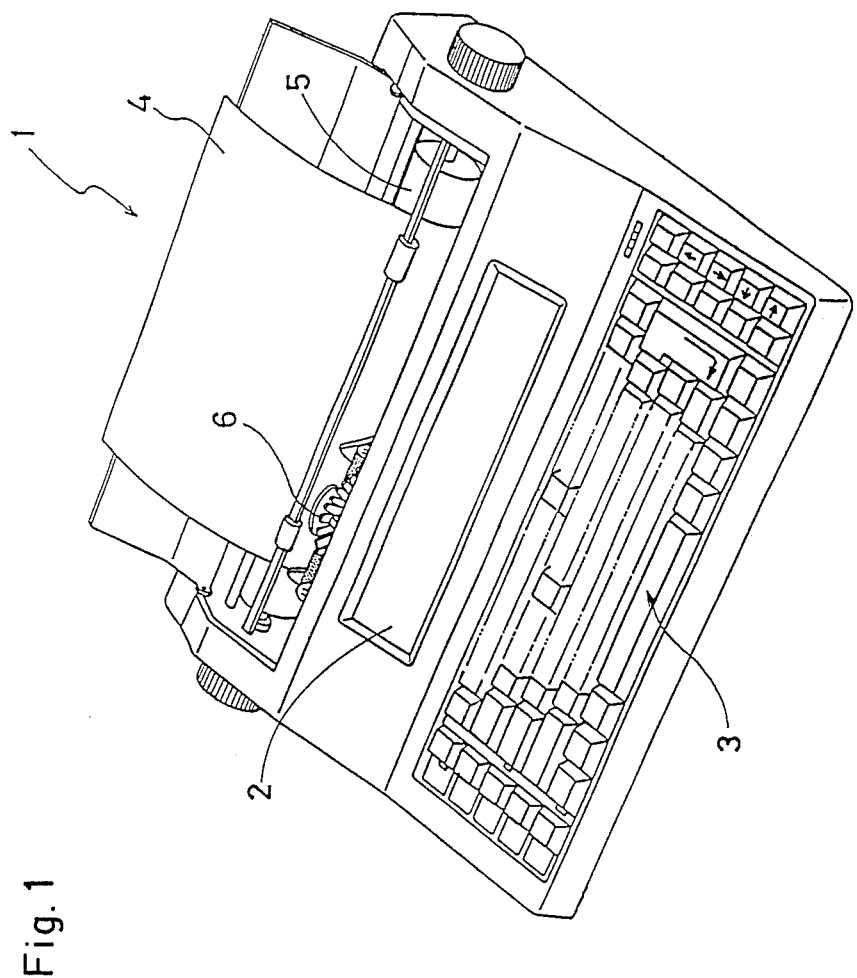
FIG. 1 is a perspective view of a daisy-wheel type electronic typewriter.
Figure 2:
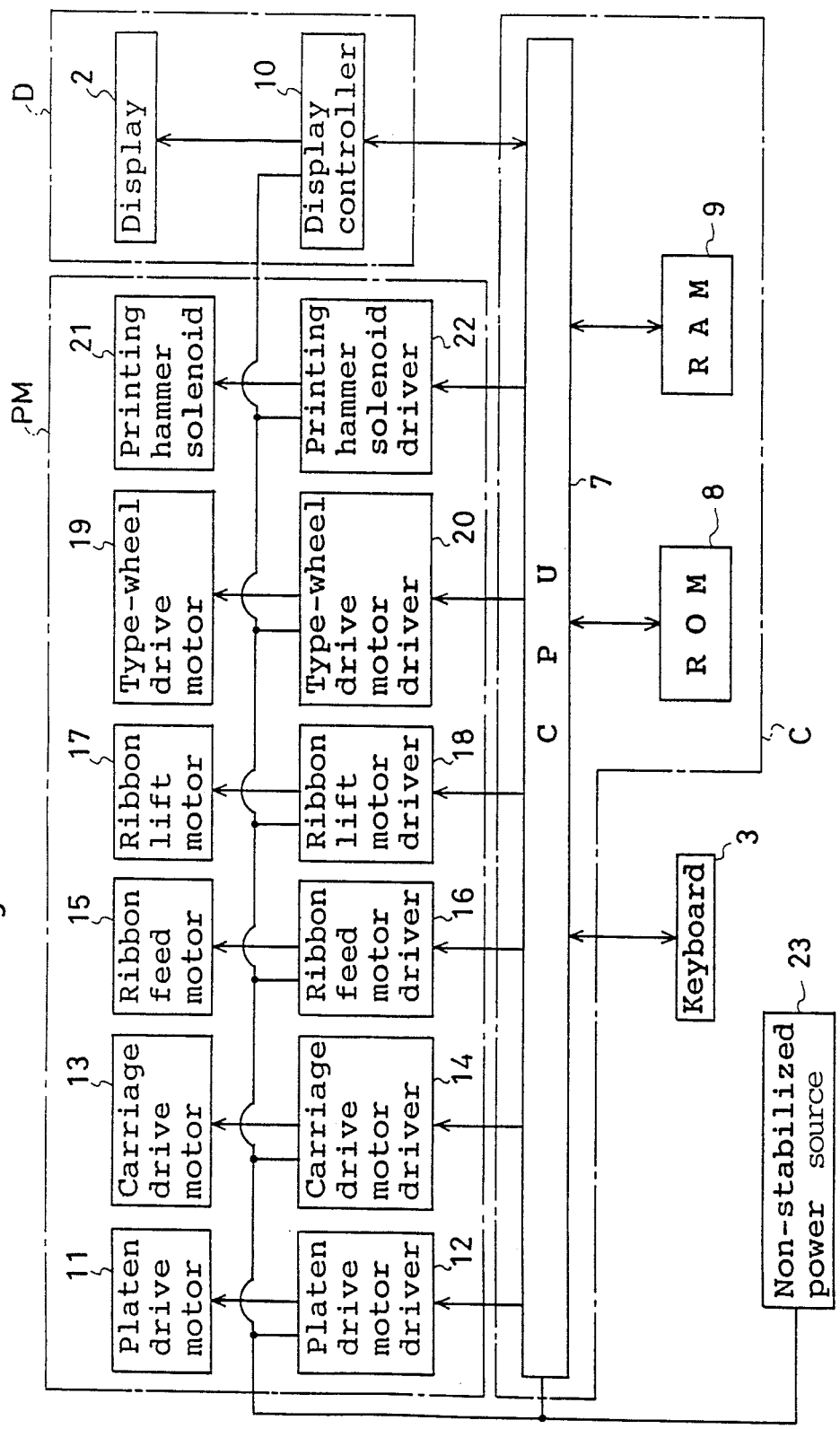
FIG. 2 is a block diagram of a control system for an electronic typewriter applying the first invention.

As shown in FIG. 1, the daisy-wheel type electronic typewriter 1 is provided with a printing mechanism installed at the rear part of a main unit, a liquid crystal display 2 installed at the center part of the main unit, a keyboard 3 installed at the front part of the main unit and a controlling apparatus C likewise the general electronic typewriter.

The above-mentioned printing mechanism is provided with a roller-shaped platen 5 for line-feeding a print paper 4, a carriage driven right and left in a reciprocative manner, a type-wheel 6 (daisy-wheel) incorporated in the carriage, a ribbon stored in a ribbon cassette loaded on the carriage, a mechanism for lifting a ribbon cassette holder, a printing hammer, and an electric actuators for driving these elements respectively, and the structures themselves of these equipment, mechanism and electric actuators are similar to those of the general typewriter, and therefore detailed description thereon is omitted here.

Description is made on a control system of the above-mentioned controlling apparatus C consists of a CPU (central processing unit) 7, a ROM (read only memory) 8 connected to the CPU 7 and a RAM (random access memory) 9 connected to the CPU 7, and the keyboard 3, a drive part PM of the printing mechanism and a display controller 10 of a displaying apparatus D are connected to the CPU 7.

The drive part PM of the printing mechanism is constituted with a platen drive motor 11 and a platen drive motor driver 12, a carriage drive motor 13 and a carriage drive motor driver 14, a ribbon feed motor 15 and a ribbon feed motor driver 16, a ribbon lift motor 17 and a ribbon lift motor driver 18, a type-wheel drive motor 19 and a type-wheel drive motor driver 20, and a printing hammer solenoid 21 and a printing hammer solenoid driver 22.

The displaying apparatus D is constituted with the display 2 and the display controller 10, and the respective drivers 12, 14, 16, 18, 20 and 22 and the display controller 10 are connected to the CPU 7 respectively, and also connected to a non-stabilized power source 23, respectively.

Respective configurations and functions of the ROM 8 and the RAM 9 of the controlling apparatus C are also similar to those of the general typewriter, except the following driving control.

Next, description is made on a driving method of the above-mentioned printing apparatus in accordance with the present first invention.

Figure 3:
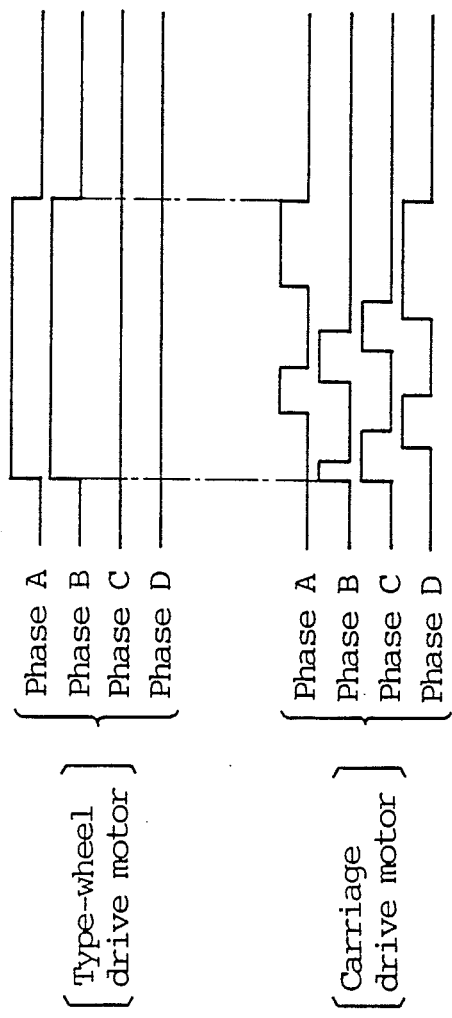
FIG. 3 is an operational time chart of exciting currents of a type-wheel drive motor and a carriage drive motor.

First, when the printing operation is made, the carriage drive motor 13, the type-wheel drive motor 19, the printing hammer solenoid 21 and the ribbon feed motor 15 are operated as same as conventional operation. Also, when the spacing operation is made, the type-wheel drive motor 19 which is an electric actuator other than the carriage drive motor 13 is operated in a manner that the type-wheel 6 is not rotated. As for this type writer 1, the type-wheel drive motor 19 and the carriage drive motor 13 are composed of a four-phase step motor respectively, being driven by 1--2 phase excitation. As shown in FIG. 3, in the spacing operation, a predetermined driving current is supplied to the carriage drive motor 13 for a predetermined time, and at the same time, a driving current is supplied continuously to phases A and B which are adjacent excitation phases of the type-wheel drive motor 19 for the above-mentioned predetermined time.

In addition, a control program controlling the type-wheel drive motor 19 as described above in response to an operation of a space key is inputted and stored in advance in a program memory of the ROM 8.

In this case, the type-wheel drive motor 19 does not rotate, but consumes power, and therefore the current supplied from the non-stabilized power supply 23 increases and an increase in the current flowing through the carriage drive motor 13 does not take place. That is to say, currents flowing through the respective motors and the like in the printing operation and the spacing operation are as shown in Table 2.

Figure 4:
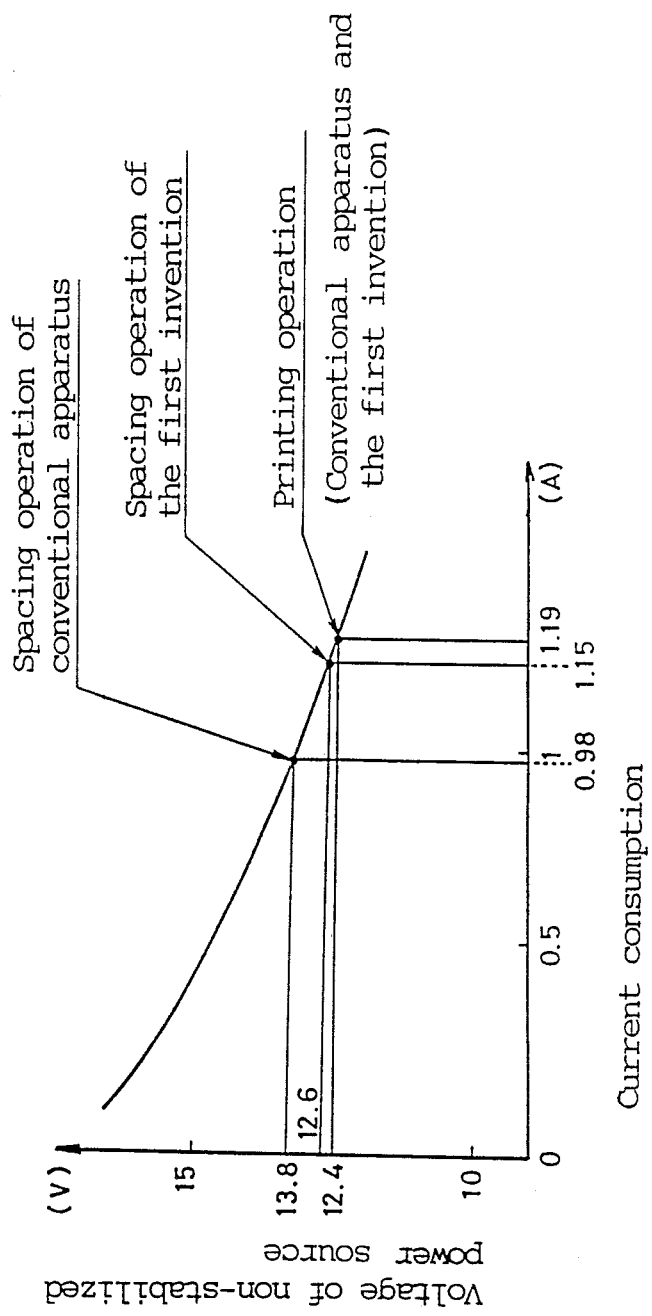
FIG. 4 is a graph showing a voltage-current characteristic of a non-stabilized power supply.

In addition, the above-mentioned non-stabilized power source 23 is assumed to have, for example, a voltage-current characteristic as shown in FIG. 4.

TABLE 2

|  | Printing Operation | Spacing Operation |
|---|---|---|
| Voltage of non-stabilized power supply | 12.4 V | 12.6 V |
| Current of drive circuit | 0.10 A | 0.10 A |
| Carriage drive motor | 0.67 A | 0.68 A |
| Type-wheel drive motor | 0.22 A | 0.37 A |
| Hammer solenoid | 0.10 A | 0.00 A |
| Platen drive motor | 0.00 A | 0.00 A |
| Ribbon feed motor | 0.10 A | 0.00 A |
| Total current | 1.19 A | 1.15 A |

Accordingly, as is obvious from Table 2, the current flowing through the carriage drive motor 13 is nearly the same both in the printing operation and in the spacing operation, thereby being stabilized. This is the same also for the voltage acting on the carriage drive motor 13.

In addition, it is needless to say that the platen drive motor 11 and other motors may be operated without rotating in place of the type-wheel drive motor 19 in the spacing operation.

Thus, in the spacing operation, the electric load of the non-stabilized power supply becomes very small, and the current flowing through the carriage drive motor 13 is likely to be increased, but as described above, an increase in the current flowing through the carriage drive motor 13 is prevented by supplying a current also to the type-wheel drive motor 19, and thereby the maximum assured current values of the circuit elements of the carriage drive motor driver 14 can be reduced by one rank to make the carriage drive motor driver 14 more economical.

Also, since the current and voltage supplied to the carriage drive motor 13 in the spacing operation are reduced, the time required for the spacing operation is reduced by reducing the exciting time of the stop control, and thereby the speed of the whole printing processing can be increased.

In addition, the spacing operation includes both of the operation in the printing direction and the operation in the direction reverse to the printing direction. Also, in the carriage returning operation, generally the platen drive motor 11 is also energized, and therefore this operation has no particular problem. However, the above-mentioned driving method may be adopted as required also in the carriage returning operation.

Next, description is made on a driving method of a printing apparatus in accordance with the present second invention.

In the above-mentioned embodiment of the driving method in accordance with the first invention, the type-wheel drive motor 19 is operated so as not to rotate in the spacing operation, while in an embodiment of the driving method in accordance with this second invention, an additional electric load is connected separately to the non-stabilized power supply 23 in advance, and a resistor 24 as the above-mentioned electric load is energized in the spacing operation, this being the difference from the case of the first invention.

Figure 5:
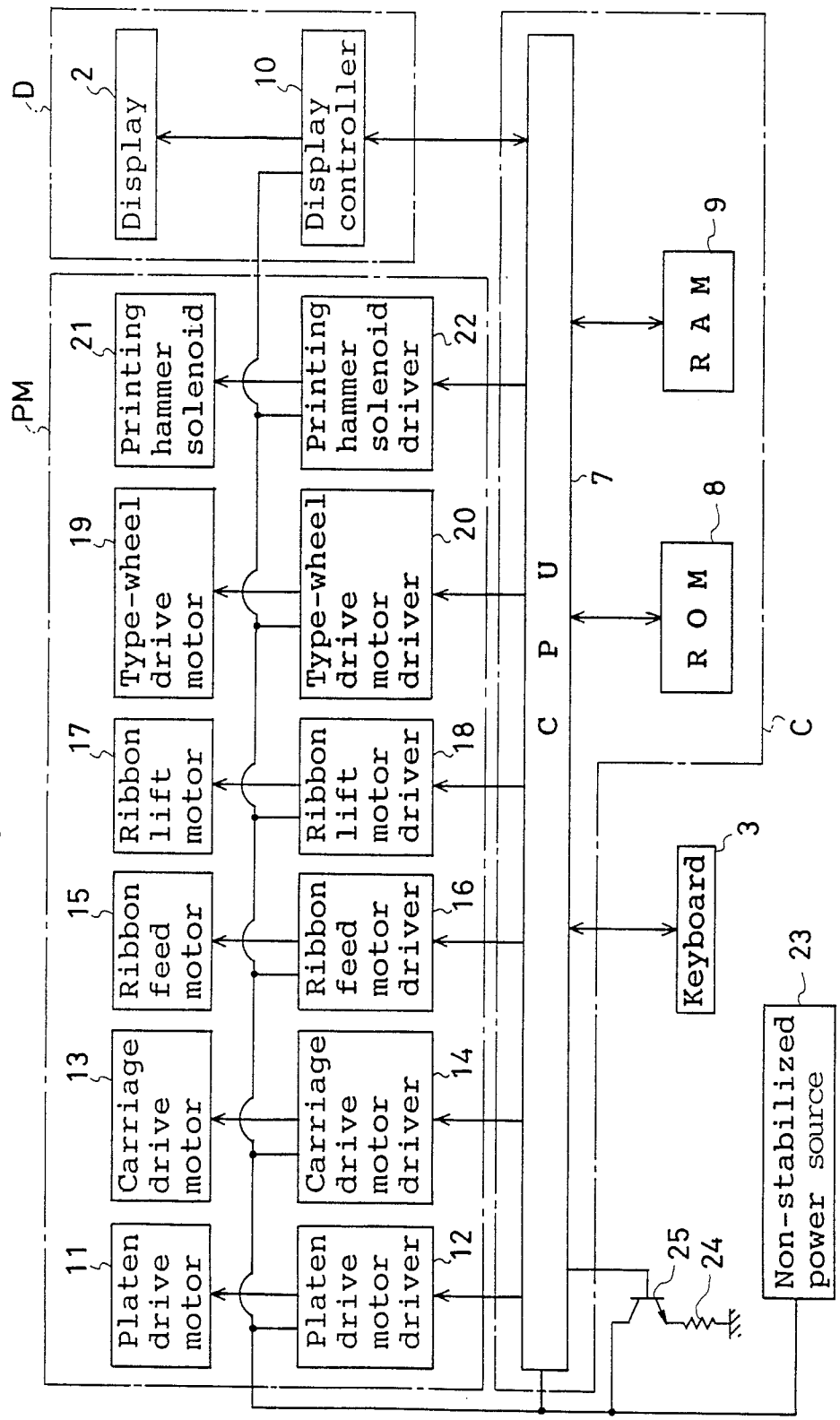
FIG. 5 is a block diagram of a control system for an electronic typewriter applying the second invention.

As shown in FIG. 5, configuration is made in such a manner that the resistor 24 is connected to the non-stabilized power source 23 through a switching NPN transistor 25, and in the spacing operation a control signal is outputted to the base of the transistor 25 from the CPU 7 to make the transistor 25 conductive, and thereby the resistor 24 is energized.

In spacing operation, a control signal is outputted to the base of the transistor 25 based on the control program of the ROM 8 in response to an operation of the space key, and thereby the transistor 25 is made conductive and the resistor 24 is energized by electric power from the non-stabilized power source 23 through the transistor 25.

Thus, the electric load of the non-stabilized power source 23 is increased in the spacing operation, and therefore increases in the current and voltage acting on the carriage drive motor 13 can be prevented.

Currents flowing through the respective motors and the like in the printing operation and in the spacing operation are as shown in Table 3.

TABLE 3

|  | Printing Operation | Spacing Operation |
|---|---|---|
| Voltage of non-stabilized power supply | 12.4 V | 12.4 V |
| Current of drive circuit | 0.10 A | 0.10 A |
| Carriage drive motor | 0.67 A | 0.67 A |
| Type-wheel drive motor | 0.22 A | 0.00 A |
| Hammer solenoid | 0.10 A | 0.00 A |
| Platen drive motor | 0.00 A | 0.00 A |
| Ribbon feed motor | 0.10 A | 0.00 A |
| Ground | 0.00 A | 0.42 A |
| Total current | 1.19 A | 1.19 A |

In addition, the above description was made on the embodiments where the first and the second inventions are applied to the daisy-wheel type typewriter, but the first and the second inventions can be applied likewise also to the type-ball type typewriter, thermal head type typewriter and printing apparatuses for various types of word processors.

What is claimed is:

1. A driving method of a printing apparatus employing a non-stabilized power source comprising:
   connecting plural electric actuators of a printing apparatus, the said non-stabilized power source,
   providing drive means for driving said plural electric actuators respectively, and control means for controlling said driving means,
   whenever driving a carriage driving motor during a non-printing operation without actuation of the printing hammer drive solenoid, continuously driving through said control means and driving means a type-wheel drive motor in a mode not generating its rotation in order to stabilize the current and voltage supplied to said carriage drive motor during said non-printing operation.

2. A driving method of a printing apparatus employing a non-stabilized power source according to claim 1, wherein said type-wheel drive motor is a step motor of plural phases, and said control means excites at least one phase of the step motor without its rotation.

3. A driving method of a printing apparatus employing a non-stabilized power source according to claim 1, wherein said control means drives said type-wheel drive motor during a spacing operation when a carriage moves toward a printing direction and the reverse direction without actuation of said type-wheel drive motor.

4. A driving method of a printing apparatus employing a non-stabilized power source comprising:
   connecting plural electric actuators of a printing apparatus to said non-stabilized power source, providing an additional electric resistor, connected to said non-stabilized power source, providing driving means for driving said plural electric actuators and said electric resistor, respectively, and a control means for controlling said plural electric actuators and said electric resistor, whenever driving a carriage drive motor in a non-printing operation without actuation of a printing hammer drive solenoid, continuously driving said electric resistor through said control means and driving means in order to stabilize the current and voltage supplied to said carriage drive motor during said non-printing operation.

5. A driving method of a printing apparatus employing a non-stabilized power source according to claim 4, wherein said control means drives said electric resistor during a spacing operation when a carriage moves toward a printing direction and the reverse direction without actuation of said printing drive means.

6. A printing apparatus for use with a non-stabilized power source comprising:

a plurality of electric actuators of a printing apparatus;

means for driving said plurality of electric actuators respectively with power from said non-stabilized power source;

an additional electric resistor connected to said non-stabilized power source;

a control means for controlling said plural electric actuators and said electric resistor, to drive said electric actuators in various combinations and to continuously drive said electric resistor when driving a carriage drive motor during a spacing operation when a carriage moves towards a printing direction and the reverse direction and for stabilizing the current and voltage supplied to said carriage drive motor.

* * * * *